United States Patent [19]

Owada

[11] Patent Number: 5,533,024
[45] Date of Patent: Jul. 2, 1996

[54] RADIO CHANNEL SELECTION METHOD AND SYSTEM

[75] Inventor: Junichi Owada, Tokyo, Japan

[73] Assignee: NEC Corporation, Tokyo, Japan

[21] Appl. No.: 400,881

[22] Filed: Mar. 8, 1995

[30] Foreign Application Priority Data

Mar. 8, 1994 [JP] Japan .................................. 6-062202

[51] Int. Cl.$^6$ ................................................. H04B 7/212
[52] U.S. Cl. ........................... 370/84; 370/95.3; 455/34.1; 455/54.2
[58] Field of Search .................................. 455/34.1, 54.1, 455/54.2, 88; 370/82, 83, 84, 85.7, 95.1, 95.3

[56] References Cited

U.S. PATENT DOCUMENTS

| | | | |
|---|---|---|---|
| 5,299,199 | 3/1994 | Wilson et al. | 370/85.7 |
| 5,343,513 | 8/1994 | Kay et al. | 370/95.1 |
| 5,369,637 | 11/1994 | Richardson et al. | 370/95.3 |

FOREIGN PATENT DOCUMENTS

| | | |
|---|---|---|
| 0472511A2 | 2/1992 | European Pat. Off. . |
| 4-323921 | 11/1992 | Japan . |
| WO94/13069 | 6/1994 | WIPO . |

*Primary Examiner*—Benedict V. Safourek
*Attorney, Agent, or Firm*—Foley & Lardner

[57] ABSTRACT

In a radio channel selection method, when an originating operation is performed, a mobile terminal transmits a call setting signal indicating that communication can be performed by either of first and second communication schemes in different communication forms. A radio base station then receives the call setting signal from the mobile terminal, and it is checked whether there is any available radio channel in the first communication scheme. If there is an available radio channel in the first communication scheme, the selected available radio channel is transmitted, as a radio channel designation signal, to the mobile terminal. If there is no available radio channel in the first communication scheme, a search for an available radio channel in the second communication scheme is performed. If there is an available radio channel in the second communication scheme, the selected available radio channel is transmitted, as a radio channel designation signal, to the mobile terminal. If there is no available radio channel in both the first and second communication schemes, a clear-forward signal is transmitted to the mobile terminal. A radio channel selection system is also disclosed.

8 Claims, 5 Drawing Sheets

RADIO CHANNEL SELECTION METHOD AND SYSTEM

BACKGROUND OF THE INVENTION

The present invention relates to a mobile communication system radio channel selection method and system for assigning radio channels for communication to mobile terminals having a plurality of different communication schemes so as to perform line connection with respect to the mobile terminals.

With recent advances in multi-vender systems and open network systems in the field of mobile communication, systems in which apparatuses for performing switching control and radio channel management are respectively shared in mobile switching centers and radio base stations have been constructed. In addition, half-rate speech codec techniques of decreasing the coding bit rate to accommodate more subscribers and realize effective use of radio frequencies have been developed.

A system using two communication schemes (radio channel access schemes), i.e., a TDMA (Time Division Multiple Access) scheme designed for 3-channel multiplexing per carrier (to be referred to as a full rate scheme hereinafter) and a TDMA scheme designed for 6-channel multiplexing per carrier (to be referred to as a half rate scheme hereinafter) is expected to be introduced in the near future. The full rate scheme uses a full rate codec scheme with a coding bit rate of 11.2 kbps. The half rate scheme uses a half rate codec scheme with a coding bit rate of 5.6 kbps. The two schemes, however, are not compatible with each other because of different speech coding algorithms and different error correction schemes. Therefore, radio channel management which can cope with both the communication schemes is required, in addition to conventional radio channel management.

FIG. 5 shows the system disclosed in Japanese Patent Laid-Open No. 4-323921, which is used to explain a conventional channel selection technique. Mobile terminals 3a to 3d are respectively connected to lower line connection units 2a and 2b, which are connected to a host line connection unit 1. When a shortage of frequencies managed by the lower line connection units 2a and 2b occurs, frequencies managed by the upper line connection unit 1 are assigned to lower line connection units 2a and 2b in which the frequency shortage has occurred.

If the mobile terminals 3a to 3d are designed to selectively use the full rate scheme and the half rate scheme, frequency management can be easily performed by applying the method shown in FIG. 5.

Frequency management, however, must be performed not only in the upper line connection unit 1 but also in the lower line connection units 2a and 2b, resulting in a complicated arrangement. Assume that frequency management is to be performed only in the lower line connection units 2a and 2b to prevent the above problem. In this case, since the full rate scheme and the half rate scheme are not compatible with each other, as described above, frequencies must be assigned and fixed to the full rate scheme and the half rate scheme, respectively. In this case, if no available channel is present in one scheme, any available channel in the other scheme cannot be used.

SUMMARY OF THE INVENTION

It is an object of the present invention to provide a radio channel selection method and system in which when the radio channels assigned to one communication scheme includes no available channel, an available channel of the radio channels assigned to the other communication scheme can be used in a system having a plurality of different communication schemes.

In order to achieve the above object, according to the present invention, there is provided a radio channel selection method comprising the steps of causing a mobile terminal, in an originating operation, to transmit a call setting signal indicating that communication can be performed by either of first and second communication schemes in different communication forms, causing a radio base station to receive the call setting signal from the mobile terminal and checking whether there is any available radio channel in the first communication scheme, if there is an available radio channel in the first communication scheme, transmitting the selected available radio channel, as a radio channel designation signal, to the mobile terminal, if there is no available radio channel in the first communication scheme, searching for an available radio channel in the second communication scheme, if there is an available radio channel in the second communication scheme, transmitting the selected available radio channel, as a radio channel designation signal, to the mobile terminal, and if there is no available radio channel in both the first and second communication schemes, transmitting a clear-forward signal to the mobile terminal.

DESCRIPTION OF THE PREFERRED EMBODIMENT

Figure 1:
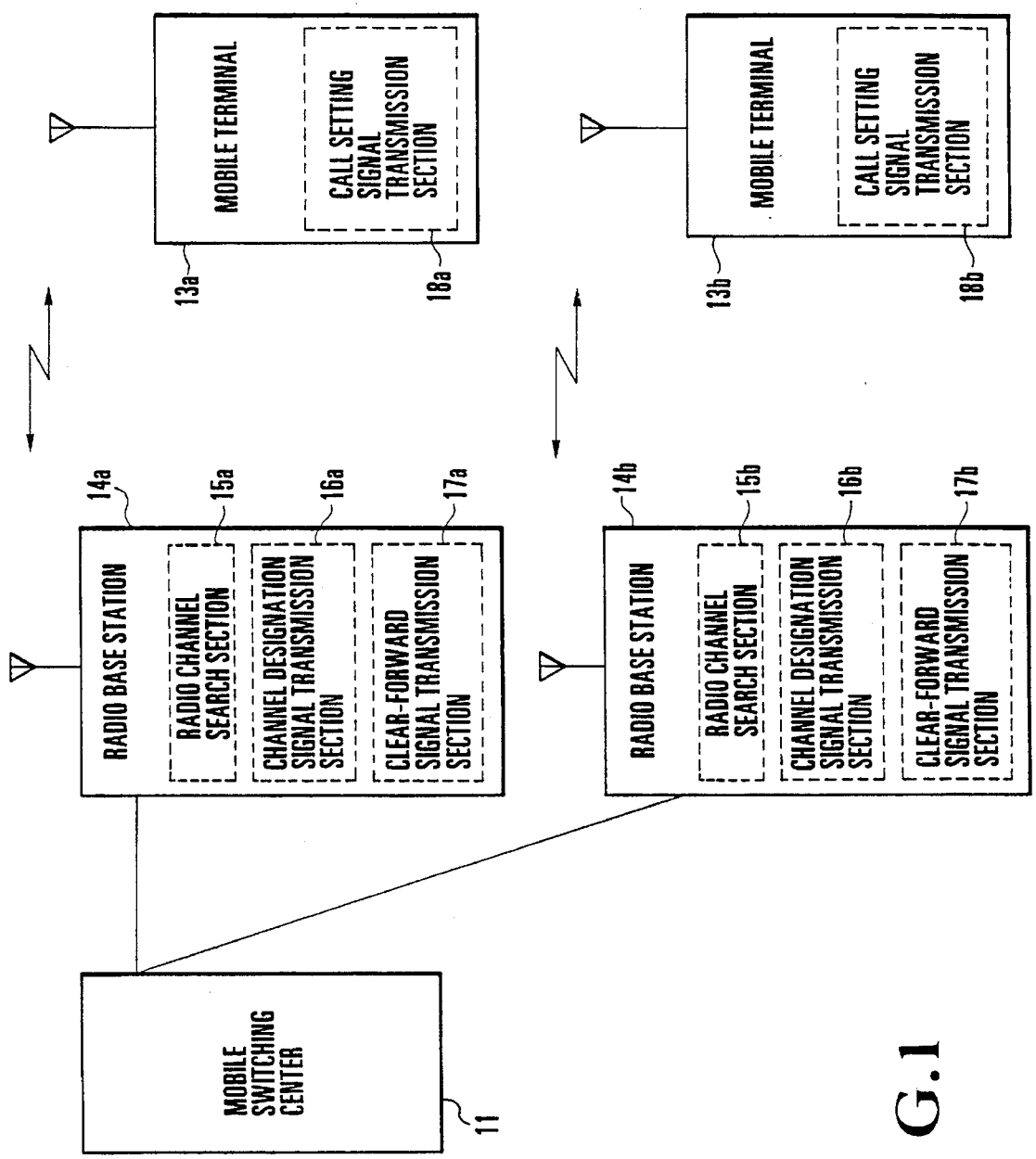
FIG. 1 is a block diagram showing a radio channel selection system according to an embodiment of the present invention.
Figure 2A:
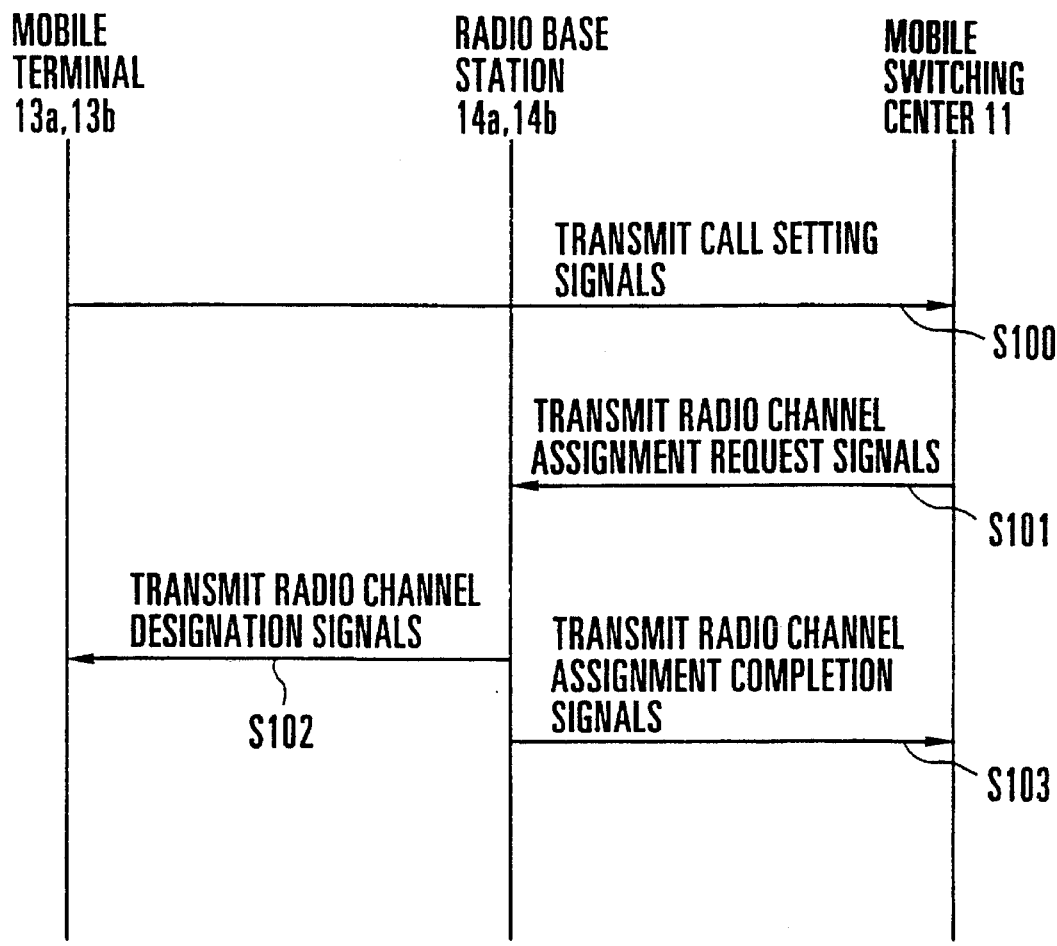
FIGS. 2A and 2B are views showing how signals are exchanged between an originating mobile terminal and a base station.
Figure 2B:
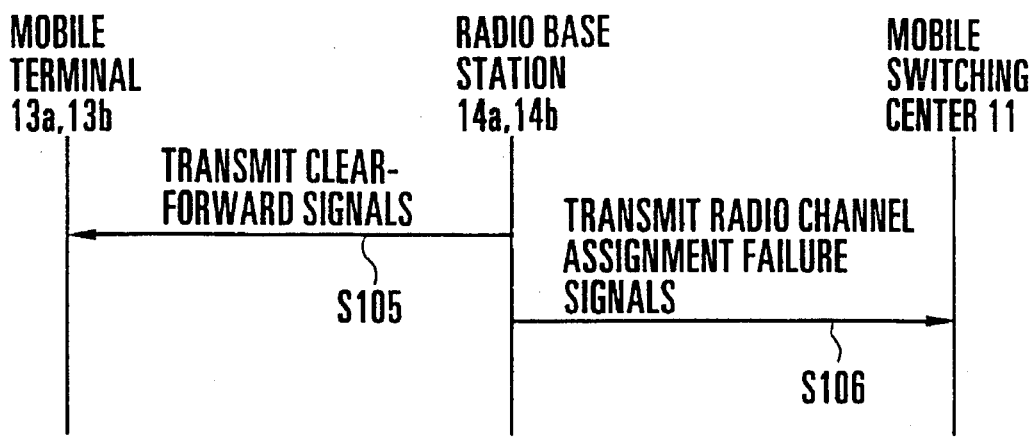
Figure 3:
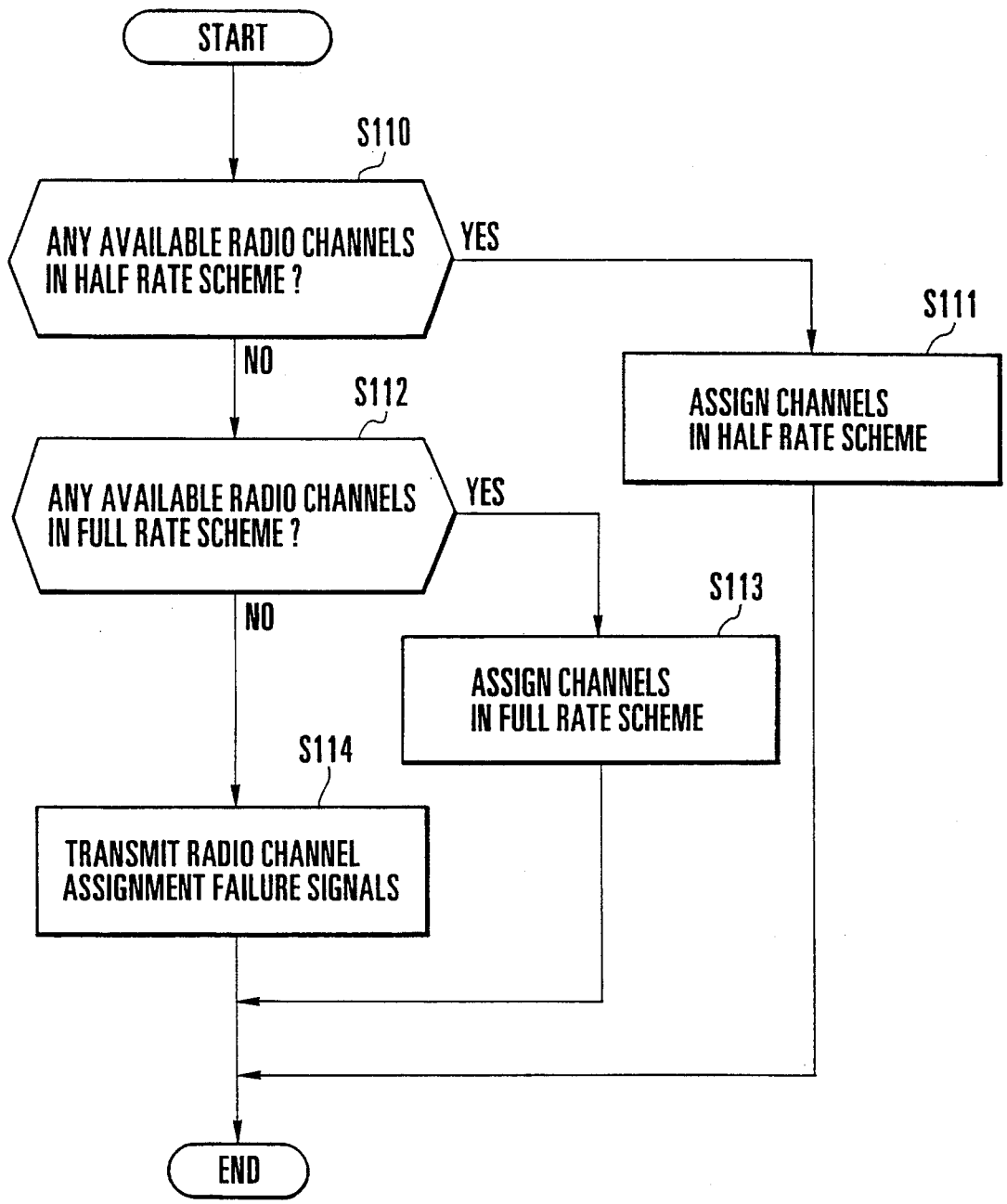
FIG. 3 is a flow chart showing a sequence for searching an available channel.
Figure 4A:
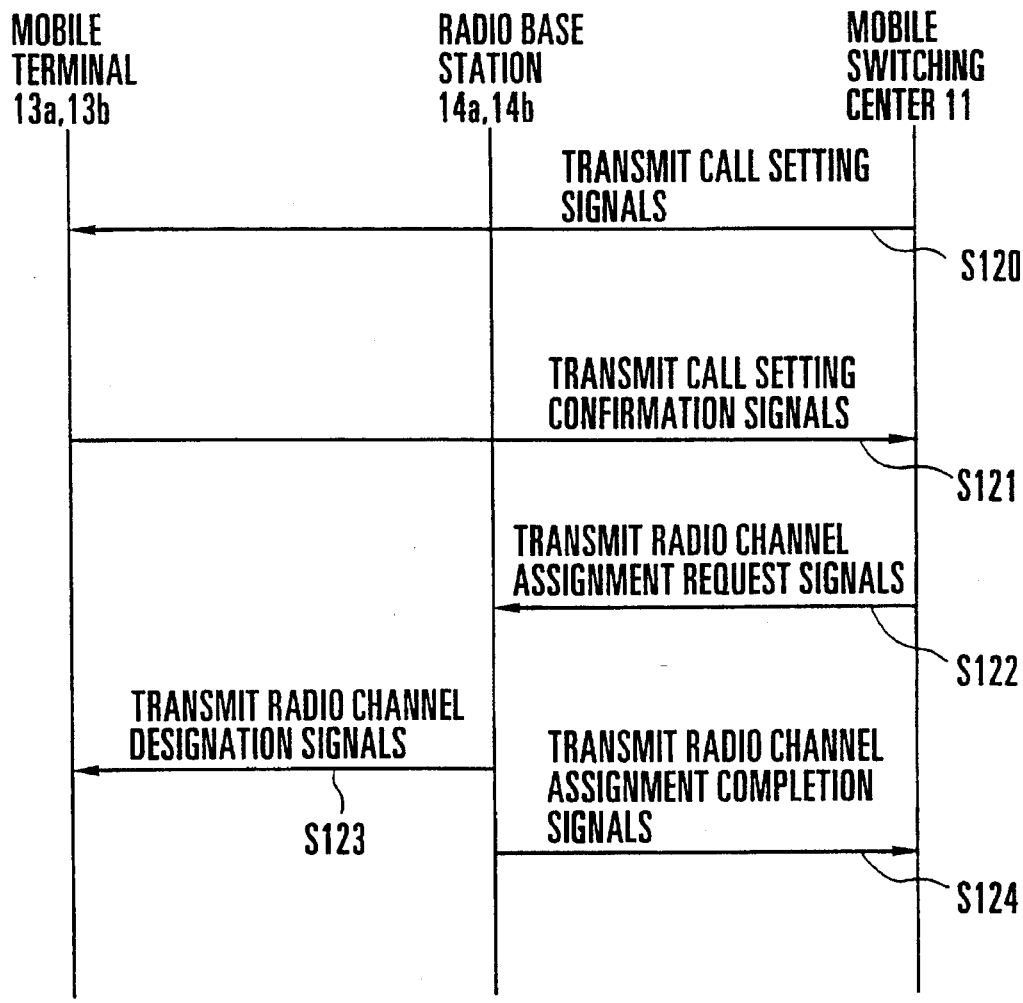
FIGS. 4A and 4B are views showing how signals are exchanged between a base station and a terminating mobile terminal.
Figure 4B:
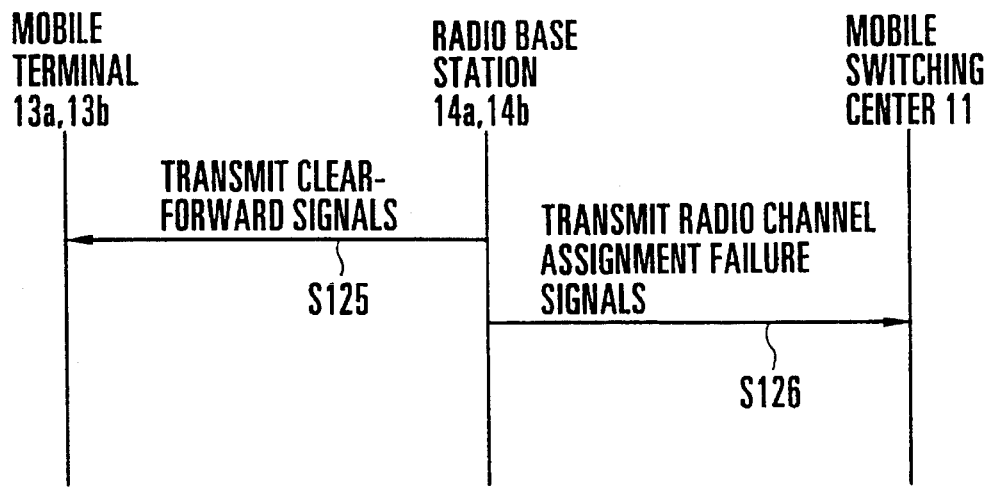
Figure 5:
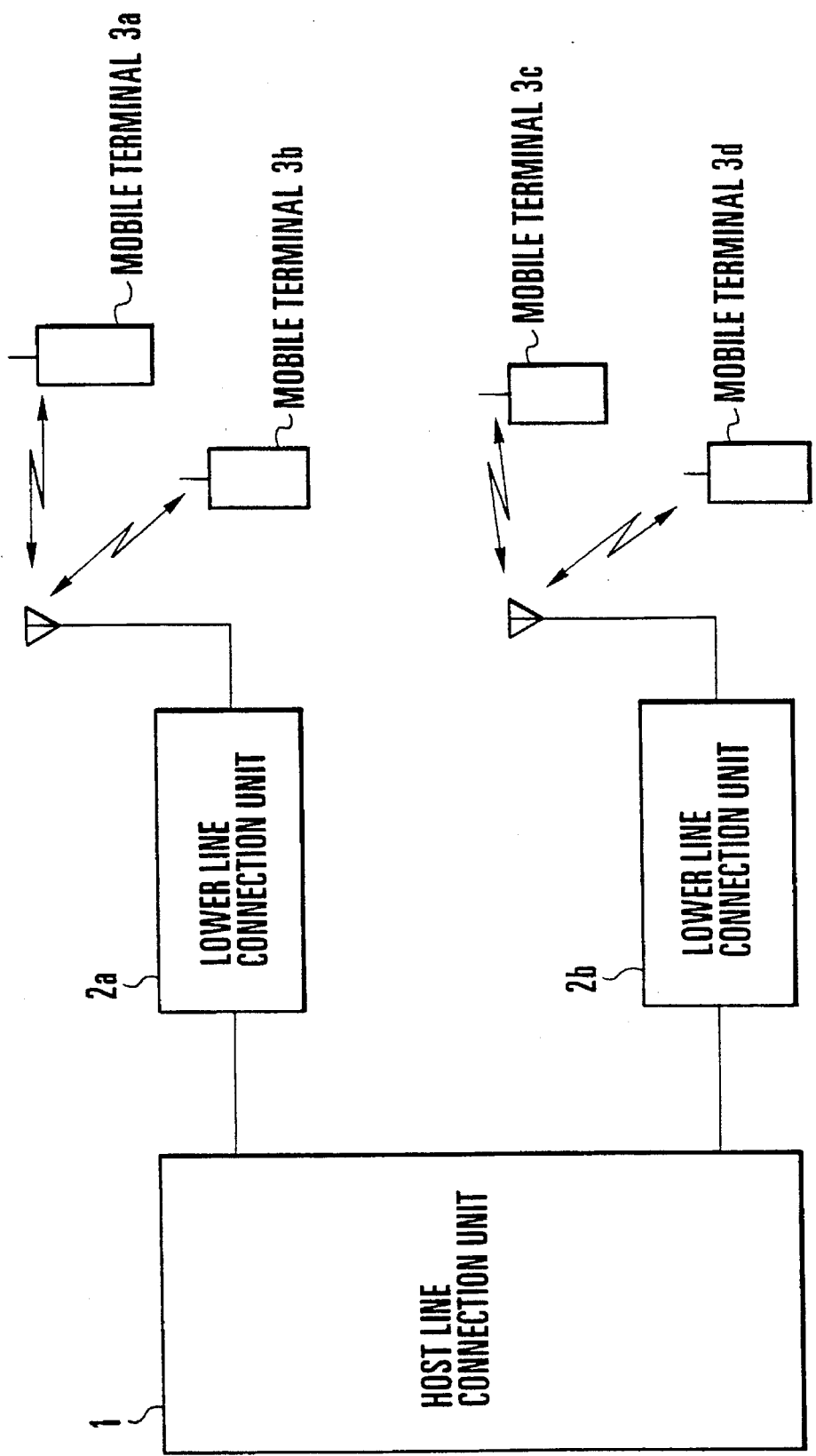
FIG. 5 is a block diagram showing a conventional radio channel selection system.

FIG. 1 shows the arrangement of a radio channel selection system according to an embodiment of the present invention. FIGS. 2A and 2B show schematic signal sequences associated with radio channel assignment among mobile terminals, radio base stations, and a mobile switching center in originating operations of the mobile terminals. FIG. 3 shows radio channel assignment processing performed by a radio base station. FIGS. 4A and 4B show schematic signal sequences associated with radio channel assignment among the mobile terminals, the radio base stations, and the mobile switching center in terminating operations of the mobile terminals. Assume that the communication schemes employed in all the cases in this embodiment include the two types of communication schemes, i.e., the full rate scheme and the half rate scheme.

Referring to FIG. 1, a mobile switching center 11 has a switching connection function and a radio base station management function, and performs call connection with respect to mobile terminals 13a and 13b via radio base stations 14a and 14b. The radio base stations 14a and 14b are connected to the mobile switching center 11. Each radio base station has a radio transmission/reception function corresponding to both or either of the full rate scheme and the half rate schemes as communication schemes for mobile terminals 13a and 13b. In addition, the radio base stations 14a and 14b manage/apply their own radio channels, perform radio communication between mobile terminals 13a and 13b in their own radio communication areas, and perform call connection with respect to the mobile switching center 11. The mobile terminals 13a and 13b include three types of mobile terminals, i.e., a terminal having a radio transmission/reception function based on only the full rate scheme; a terminal having a radio transmission/reception function based on only the half rate scheme; and a terminal having a radio transmission/reception function capable of performing communicating by selecting either the full rate scheme or the half rate scheme.

The radio base stations 14a and 14b respectively comprise radio channel search sections 15a and 15b, channel designation signal transmission sections 16a and 16b, and clear-forward signal transmission sections 17a and 17b. The radio channel search sections 15a and 15b search for available channels by using the half rate scheme and the full rate scheme in this order in response to outgoing calls from the mobile terminals 13a and 13b. The channel designation signal transmission sections 16a and 16b transmit pieces of information on the available channels found by the radio channel search sections 15a and 15b, as available channel designation signals, to the mobile terminals 13a and 13b which have generated the outgoing calls. The clear-forward signal transmission sections 17a and 17b transmit clear-forward signals to the mobile terminals 13a and 13b, which have generated the outgoing calls, when no available channels are found.

The mobile terminals 13a and 13b respectively comprise call setting signal transmission sections 18a and 18b for transmitting call setting signals to the radio base stations 14a and 14b in originating operations. Each call setting signal indicates that communication can be performed by using either the half rate scheme or the full rate scheme.

The operation of this system will be described next with reference to FIGS. 2A and 2B. A case wherein each of the mobile terminals 13a and 13b has a radio transmission/ reception function allowing communication based on only the full rate scheme will be described first with reference to FIG. 2A. The call setting signal transmission sections 18a and 18b of the mobile terminals 13a and 13b transmit call setting signals in originating operations (step S100). That is, pieces of transfer ability information indicating that communication can be performed by the full rate scheme are transmitted to the mobile switching center 11 via the radio base stations 14a and 14b (step S100).

The mobile switching center 11 sends radio channel assignment request signals to the radio base stations 14a and 14b, while radio channel type information designating the full rate scheme is set in each signal (step S101). The radio channel search sections 15a and 15b of the radio base stations 14a and 14b search for unused channels in the full rate scheme. The channel designation signal transmission sections 16a and 16b then transmit pieces of information on the selected unused channels, as radio channel designation signals, to the mobile terminals 13a and 13b, respectively (step S102). At the same time, the channel designation signal transmission sections 16a and 16b transmit the pieces of information on the selected unused channels, as radio channel assignment completion signals, to the mobile switching center 11 (step S103).

If there are no unused channels in the full rate scheme, the clear-forward signal transmission sections 17a and 17b of the radio base stations 14a and 14b transmit clear-forward signals to the mobile terminals 13a and 13b as in the prior art, as shown in FIG. 2B (step S105). At the same time, the clear-forward signal transmission sections 17a and 17b transmit radio channel assignment failure signals to the mobile switching center 11 (step S106).

If each of the mobile terminals 13a and 13b has a radio transmission/reception function of performing communication by only the half rate scheme, communication processing is also performed in the manner shown in FIGS. 2A and 2B. That is, when the mobile terminals 13a and 13b generate outgoing calls, the call setting signal transmission sections 18a and 18b transmit pieces of transfer ability information indicating that communicating can be performed only by the half rate scheme, as call setting signals, to the mobile switching center 11 via the radio base stations 14a and 14b (step S100).

Assume that the mobile switching center 11 checks whether the radio base stations 14a and 14b have transmission/reception units capable of performing communication by the half rate scheme, and determines that they are radio base stations capable of such communication. In this case, the mobile switching center 11 transmits radio channel assignment request signals to the radio base stations 14a and 14b, respectively, while setting radio channel type information designating the half rate scheme in each signal (step S101).

The radio channel search sections 15a and 15b of the radio base stations 14a and 14b search for unused channels in the half rate scheme. The channel designation signal transmission sections 16a and 16b then transmit pieces of information on the selected unused channels, as radio channel designation signals, to the mobile terminals 13a and 13b (step S102). At the same time, the channel designation signal transmission sections 16a and 16b transmit the pieces of information on the selected unused channels, as radio channel assignment completion signals, to the mobile switching center 11 (step S103).

If there are no unused channels in the half rate scheme, the clear-forward signal transmission sections 17a and 17b of the radio base stations 14a and 14b transmit clear-forward signals to the mobile terminals 13a and 13b as in the prior art, as shown in FIG. 2B (step S105). At the same time, the clear-forward signal transmission sections 17a and 17b transmit radio channel assignment failure signals to the mobile switching center 11 (step S106).

If each of the mobile terminals 13a and 13b has a radio transmission/reception function of performing communication by using both the full rate scheme and the half rate scheme, communication processing is performed in the manner shown in FIGS. 2A and 2B. That is, when the mobile terminals 13a and 13b generate outgoing calls, the call setting signal transmission sections 18a and 18b transmit pieces of transfer ability information indicating that communication can be performed by both the full rate scheme and the half rate scheme, as call setting signals, to the mobile switching center 11 via the radio base stations 14a and 14b (step S100).

Assume that the mobile switching center 11 checks whether each of the radio base stations 14a and 14b has both a transmission/reception unit capable of performing communication by the full rate scheme and a transmission/ reception unit capable of performing communication by the half rate scheme, and determines that each station is a radio base stations capable of performing communication by the two schemes. In this case, the mobile switching center 11 transmits radio channel assignment request signals to the radio base stations 14a and 14b, respectively, while setting radio channel type information designating the full rate scheme and the half rate scheme in each signal (step S101).

The radio channel search sections 15a and 15b of the radio base stations 14a and 14b search for unused channels in the half rate scheme first in accordance with the flow chart for radio channel assignment processing shown in FIG. 3 (step S110). If there are unused channels, the channel designation signal transmission sections 16a and 16b assign pieces of information on the selected unused channels as radio channel designation signals (step S111), and transmit them to the mobile terminals 13a and 13b (step S102). At the same time, the channel designation signal transmission sections 16a and 16b transmit the pieces of information on the selected unused channels, as radio channel assignment completion signals, to the mobile switching center 11 (step S103).

If there are no unused channels in the half rate scheme, the radio channel search sections 15a and 15b of the radio base stations 14a and 14b search for unused channels in the full rate scheme (step S112). If there are unused channels, the channel designation signal transmission sections 16a and 16b assign pieces of information on the selected unused channels as radio channel designation signals (step S113), and transmit them to the mobile terminals 13a and 13b (step S102). At the same time, the channel designation signal transmission sections 16a and 16b transmit the pieces of information on the selected unused channels, as radio channel assignment completion signals, to the mobile switching center 11 (step S103).

If there are no unused channels in the half rate scheme and the full rate scheme, the radio base stations 14a and 14b determine that radio channel assignment have failed (step S114). The clear-forward signal transmission sections 17a and 17b then transmit clear-forward signals to the mobile terminals 13a and 13b as in the prior art, as shown in FIG. 2B (step S105), and transmit radio channel assignment failure signals to the mobile switching center 11 (step S106).

In this embodiment, when each of the mobile terminals 13a and 13b has a radio transmission/reception function of performing communication by both the full rate scheme and the half rate scheme, radio channels to be assigned to the mobile terminals are selected in accordance with the pieces of radio channel type information in assignment request signals and the used state of radio channels. However, a radio channel selection method is not limited to this method.

A radio channel selection method for terminating operations with respect to the mobile terminals 13a and 13b will be described next with reference to the sequences shown in FIGS. 4A and 4B. Referring to FIG. 4A, the mobile switching center 11 transmits call setting signals to the mobile terminals 13a and 13b via the radio base stations 14a and 14b (step S120) after a normal sequence including, e.g., mobile terminal calling operations in terminating operations and verification of the mobile terminals. The mobile terminals 13a and 13b then transmit pieces of transfer ability information like those described above, as call setting confirmation signals, to the mobile switching center 11 via the radio base stations 14a and 14b (step S121). Subsequently, in this radio channel assignment sequence, operations similar to those in the above case are performed. That is, radio channel assignment request signals are sent from the mobile switching center 11 to the radio base stations 14a and 14b (step S122); radio channel designation signals are sent from the radio base stations 14a and 14b to the mobile terminals 13a and 13b (step S123); and the radio base stations 14a and 14b notify the mobile switching center 11 of radio channel assignment completion (step S124).

If there are no unused channels in terminating operations, the radio base stations 14a and 14b transmit clear-forward signals to the mobile terminals 13a and 13b, as shown in FIG. 4B (step S125). At the same time, the radio base stations 14a and 14b transmit radio channel assignment failure signals to the mobile switching center 11 (step S126).

As has been described above, according to the present invention, when an originating mobile terminal is capable of performing communication by selectively using both the full rate scheme and the half rate scheme, information indicating such a communication ability is transmitted in an originating operation. Even if, therefore, no available channels are present in one scheme, the base station can use an available channel in the other scheme, thereby performing call connection without disconnecting the call.

What is claimed is:

1. A radio channel selection method comprising the steps of:

causing a mobile terminal, in an originating operation, to transmit a call setting signal indicating that communication can be performed by either of first and second communication schemes in different communication forms;

causing a radio base station to receive the call setting signal from said mobile terminal, and checking whether there is any available radio channel in the first communication scheme;

if there is an available radio channel in the first communication scheme, transmitting information on the found available radio channel, as a radio channel designation signal, to said mobile terminal;

if there is no available radio channel in the first communication scheme, searching for an available radio channel in the second communication scheme;

if there is an available radio channel in the second communication scheme, transmitting information on the found available radio channel, as a radio channel designation signal, to said mobile terminal; and if there is no available radio channel in both the first and second communication schemes, transmitting a clear-forward signal to said mobile terminal.

2. A method according to claim 1, wherein the first communication scheme is a 3-channel time division multiple access using a full rate codec scheme with a speech coding bit rate of 11.2 kbps, and the second communication scheme is a 6-channel time division multiple access using a half rate codec scheme with a speech coding bit rate of 5.6 kbps.

3. A method according to claim 1, further comprising the step of, if there is an available radio channel in one of the first and second communication schemes, transmitting information on the selected available radio channel, as a signal indicating radio channel assignment completion, to a mobile switching center.

4. A method according to claim 1, further comprising the step of transmitting a signal indicating a radio channel assignment failure to a mobile switching center after transmitting the clear-forward signal.

5. A radio channel selection system comprising:

base stations connected to a mobile switching center; and a plurality of mobile terminals for performing communication with said base stations by selecting a plurality of radio channels in first and second communication schemes in different communication forms, each of said mobile terminals including call setting signal transmission means for, when an originating operation is performed, transmitting a call setting signal indicating that communicating can be performed by either of the first and second communication schemes, and each of said base stations including search means for searching for an available radio channel in the first and second communicating schemes in a predetermined communication scheme order upon reception of a call setting signal from said mobile terminal, channel designation signal transmission means for, when an output from said search means indicates the presence of an available radio channel, transmitting information on the found available radio channel, as a radio channel designation signal, to said mobile terminal, and clear-forward signal transmission means for transmitting a clear-forward signal to said mobile terminal when an output from said search means indicates the absence of an available radio channel.

6. A system according to claim 5, wherein the first communication scheme is a 3-channel time division multiple access using a full rate codec scheme with a speech coding bit rate of 11.2 kbps, and the second communication scheme is a 6-channel time division multiple access using a half rate codec scheme with a speech coding bit rate of 5.6 kbps.

7. A system according to claim 5, wherein if there is an available radio channel in one of the first and second communication schemes, said channel designation signal transmission means transmit information on the selected radio channel, as a signal indicating radio channel assignment completion, to said mobile switching center.

8. A system according to claim 5, wherein said clear-forward signal transmission means transmits a signal indicating a radio channel assignment failure to said mobile switching center after transmitting the clear-forward signal.

\* \* \* \* \*